UNITED STATES PATENT OFFICE.

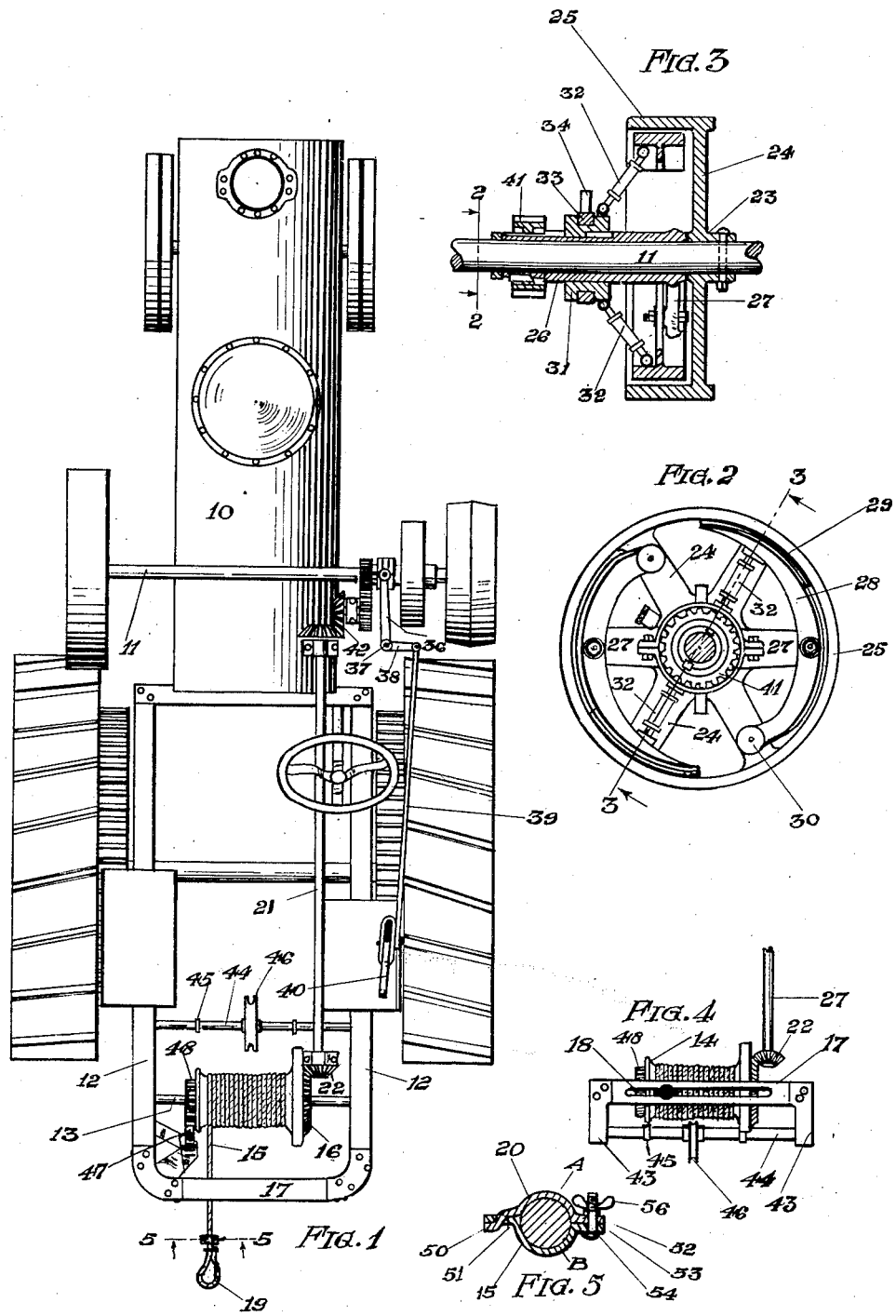

MARVIN RHINE, OF CAMBRIDGE, MINNESOTA.

TRACTOR ATTACHMENT.

1,358,329.  Specification of Letters Patent.  Patented Nov. 9, 1920.

Application filed March 25, 1919. Serial No. 285,022.

*To all whom it may concern:*

Be it known that I, MARVIN RHINE, a citizen of the United States, and resident of Cambridge, in the county of Isanti, and State of Minnesota, have invented a certain new and useful Tractor Attachment, of which the following is a specification.

The object of my invention is to provide a tractor attachment of simple, durable and inexpensive construction, including a drum with a cable mounted thereon, said drum being operatively connected with the power plant of the tractor by means including a clutch, whereby the drum may be operatively disconnected from the power plant when not in use.

A further object is to provide in connection with such a drum, a cable and guide device for holding a cable in substantially the same horizontal plane with the longitudinal axis of the drum and for permitting the cable to swing or move laterally with relation to said guide device.

Still a further object is to provide in connection with such a drum, a pulley slidably mounted, whereby the cable may be extended over the pulley and extended in the opposite direction from its normal direction from the tractor.

Still a further object is to provide on the cable above mentioned, a removable stop device adapted to be taken off to permit the release of the cable from the guide device when the cable is to be used in connection with said pulley.

With these and other objects in view, my invention consists in the construction, arrangement and combination of the various parts of the device, whereby the objects contemplated are attained, as hereinafter more fully set forth, pointed out in my claims and illustrated in the accompanying drawings, in which:

Figure 1 shows a top or plan view of a tractor equipped with an attachment embodying my invention, part of the mechanism of the tractor being omitted for permitting the clearer illustration of my attachment.

Fig. 2 shows a sectional view taken on the line 2—2 of Fig. 3.

Fig. 3 shows a sectional view taken on the line 3—3 of Fig. 2.

Fig. 4 shows a rear elevation of the drum and guide device, and

Fig. 5 shows a sectional view taken on the line 5—5 of Fig. 1.

In the accompanying drawings I have used the reference numeral 10 to indicate a tractor having the counter shaft 11, which may be connected with the power plant of the engine in any ordinary way.

At the rear lower part of the tractor are laterally spaced, rearwardly extending frame members 12, in which are mounted ends of a transverse shaft 13, on which is supported a drum 14. On the drum 14 is secured and wound a cable 15. On the drum 14 is a bevel gear 16.

The rear ends of the frame members 12 project rearwardly beyond the shaft 13, and are connected by a transverse member 17 which is formed with a transversely elongated, substantially horizontal slot 18 arranged parallel with the shaft 13 and preferably in substantially the same horizontal plane therewith. The cable 15 is extended rearwardly through the slot 18, and has at its rear end a loop 19.

Detachably mounted on the cable 15 is a removable clamp device 20, shown in Figs. 1 and 5, which clamp device is located rearwardly of the guide slot 18 and is designed to be removed when it is desired to slip the loop 19 through said slot.

Mounted in suitable bearings and extending from a point adjacent to the bevel gear 16 upwardly and forwardly in the machine, is a shaft 21. On the lower rearward end of the shaft 21 is a bevel gear 22 which meshes with the bevel gear 16.

On the counter shaft 11 is a hub 23 having radially extending spokes 24, forming a spider. At the outer ends of the spokes 24 is an annular flange or drum member 25. The hub 23 is fixed on the shaft 11. Rotatably mounted on the shaft 11, adjacent to the hub 23, is a sleeve 26, at one end of which, adjacent to the hub 23, are opposite, radially extending arms 27.

Pivotally supported between their ends on the outer ends of the arms 27 are clutch or brake shoes 28, having the engaging surfaces 29 adapted in certain positions of said shoes to engage the inner surface of said flange 25, and having at their opposite ends weights 30.

Pivoted to the collar 31, on opposite sides thereof, are adjustable link devices 32. The link devices 32 are inclined outwardly and are pivoted at their outer ends to the respective clutch shoes 28, as illustrated in Figs. 2 and 3. Rotatably mounted on the collar 31 is a ring or collar 33, having on opposite sides outwardly extending pins 34 designed to be connected with the arms of a controlling lever 36, shown in Fig. 1. The lever 36 is suitably pivoted on the frame of the machine at 37, and has a member 38 extending laterally from its pivot point.

Pivoted to the extension 38 is a rearwardly extending controlling rod 39, which is pivoted at its rear end to a lever 40. By manipulating the lever 40 the collar 31 may be moved longitudinally on the shaft 11 for throwing the shoes 29 into frictional engagement with the flange 25.

Detachably fixed on the left-hand end of the sleeve 26 is a gear member 41. The gear member 41 is operatively connected in any suitable way with the shaft 21, as, for instance, by the chain of gearing 42 shown in Fig. 1.

On the frame members 12, preferably forwardly of the shaft 13, are downwardly extending arms 43 which support a transverse shaft 44 on which are fixed spaced collars 45. Slidably and rotatably mounted on the shaft 44 between the collars 45, is a grooved pulley 46.

I will now explain, somewhat in detail, the practical operation and advantages of my improved tractor attachment.

When used in the ordinary way and when it is desired to haul a load, such, for instance, as a threshing machine separator, with the tractor, the clutch members hereinbefore described are thrown out, whereupon the loop 19 may be grasped and pulled rearwardly from the tractor and fastened to the tongue of the separator. The tractor engine may then be started, and by throwing the clutch in by means of the lever 40, the cable 15 may be wound upon the drum 14 for pulling the tongue of the separator to position close to the tractor. When the load has been drawn up close to the tractor the clutch may be thrown out and the drum locked in any suitable way, as, for instance, by means of a pawl 47 and a ratchet 48. Then when the tractor is driven forwardly the drum will be held against rotation and the load can be pulled behind the tractor.

It will be noted that the guide slot 18 holds the rope in proper position for keeping it substantially in the rear and horizontal with the center of the drum, and yet permits the rope to move from one end of the drum to the other during the winding up or unwinding process. The clamp device 20 prevents the free end of the loop being drawn through the slot 18. On account of the nature of the clutch there is no danger of breaking either the cable or the pawl 47 in case the mechanism should be operated for winding the cable on the drum until the clamp device is drawn against the member 17, or operating said mechanism when the pawl 47 is in its locking position. This is true on account of the fact that the clutch device will allow slippage.

The desirability for some such construction as that herein shown is obvious when it is suggested that there are times when the threshing machine engine is hauling a separator across country, when places are reached where, on account of hills, sand holes or mud holes, the engine cannot advance its own weight and also pull the load. Where such conditions occur, the pawl 47 may be thrown out and the engine advanced, leaving the load stand and pulling out the cable as the tractor moves forwardly. When the engine has passed the bad point in the road, the clutch may be thrown in and the tractor held stationary while the load is pulled up to the tractor, whereupon the clutch may be thrown out and the pawl thrown in.

If the engine itself should be stuck in the mud or the like, the clamp member 20 may be quickly removed. Said clamp member comprises two opposite members A and B, locked together at one side by extending a tongue 50 on the member A through a slot 51 in the member B. The opposite sides of the members A and B are provided with corresponding adjacent flanges 52 and 53, through which is extended a bolt 54 on which is a wing nut 56. By removing the wing nut 56 the clamp device may be removed from the cable and the free end of the cable drawn through the slot 18. The free end of the cable may be then extended under the pulley 46 and dragged forwardly to a point ahead of the engine and anchored. Thereupon, when the pawl 47 is thrown out and the clutch is thrown in, the tractor will pull itself forwardly by winding the cable 15 on the drum. The pulley 46 may slide longitudinally on the shaft 44 as the cable is wound on the drum from one end to the other thereof.

The advantages of a device like that shown herein are largely obvious from the foregoing description.

The capacity of the engine for hauling a load is very greatly increased inasmuch as with my device the engine can be used to carry its own weight over bad places in the road, and subsequently employed for drawing the load forwardly. The engine can even be used to pull itself out of the mud by extending the cable 15 under the pulley 46 and anchoring the end of the cable at some point ahead of the tractor.

Some changes may be made in the construction and arrangement of my improved tractor attachment, without departing from the essential features and purposes of my invention, and it is my intention to cover by my claims any modified forms of structure or use of mechanical equivalents which may be reasonably included within their scope.

I claim as my invention:

1. In a device of the class described, the combination of a tractor with a U-shaped frame, a shaft mounted on the arms of said frame, a drum on said shaft, a cable mounted on said drum, means including a clutch for connecting said drum with the operative mechanism of the tractor, a second parallel shaft mounted in said frame forwardly with relation to said first shaft, a pulley slidably mounted on said second shaft adapted to serve as a guide for said cable, and stop devices on the second shaft for limiting the movement of said pulley in accordance with the winding of the cable from or on the drum.

2. In a device of the class described, the combination of a tractor with a frame, a shaft mounted on said frame, a drum on said shaft, said frame having a slot, through which the cable hereinafter mentioned is guided, means for operatively connecting said drum with the operating mechanism of a tractor, a cable on said drum extended through said slot, a stop device on said cable for limiting the movement of the cable in one direction through the slot, and means for adjustably securing said stop device to the cable at different points in the length thereof.

Des Moines, Iowa, October 16, 1918.

MARVIN RHINE.